Dec. 18, 1962    J. WINGER ET AL    3,069,485
ANODE COLLECTOR
Filed May 4, 1960    2 Sheets-Sheet 1
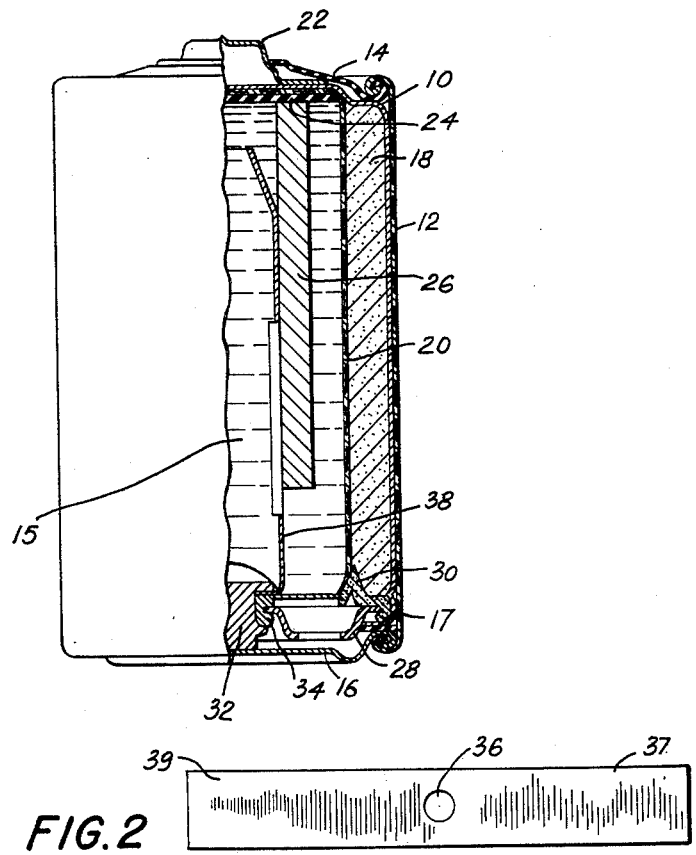
FIG.1
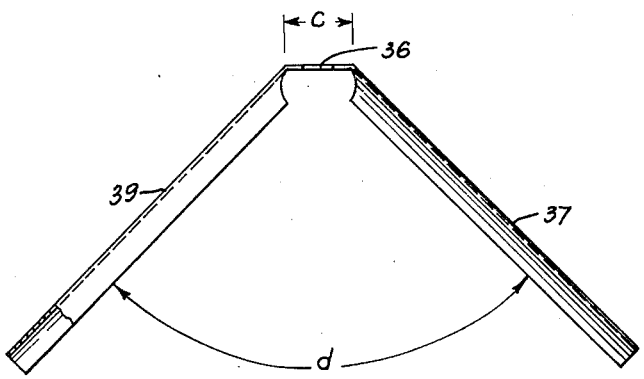
FIG.2
FIG.3
INVENTORS
JERROLD WINGER
LEROY O. SMITH
ELMER W. RICHTER
BY John F. Hohmann
ATTORNEY Dec. 18, 1962  J. WINGER ET AL  3,069,485
ANODE COLLECTOR Filed May 4, 1960  2 Sheets-Sheet 2

INVENTORS
JERROLD WINGER
LEROY O. SMITH
ELMER W. RICHTER
BY
ATTORNEY

United States Patent Office 3,069,485
Patented Dec. 18, 1962

3,069,485
ANODE COLLECTOR
Jerrold Winger, Euclid, and Le Roy O. Smith, and Elmer W. Richter, Lakewood, Ohio, assignors to Union Carbide Corporation, a corporation of New York
Filed May 4, 1960, Ser. No. 26,844
3 Claims. (Cl. 136—6)

This invention relates to an anode collector for a two-phase anode system and to a method of collecting current from an expansible anode system.

In co-pending application Serial No. 689,086, filed October 7, 1957, now U.S. Patent 2,993,947, there is disclosed a two-phase anode system for a galvanic cell consisting of an extruded hollow cylinder of anodic metal powders held in a semi-rigid state by a binding agent compatible with alkaline electrolyte. The binding agent sweels in coming to equilibrium, takes up electrolyte from an electrolyte gel and thus pushes the anodic metal toward the outer periphery of the anode and as close to the cathode as possible, thereby permitting maximum utilization thereof. Contact with the anode is made by means of a copper wire which is pushed into the semi-rigid anode and connected to an insulated negative terminal closure.

In the above-outlined system, a corollary to the desired binder swelling action is a tendency for material to disintegrate on the inner surface of the anode cylinder as it absorbs liquid from the electrolyte gel. Undesirably, this action results in lower packing through the metal-containing section, and reduces the particle-to-particle contact.

An object of the invention is to eliminate the above-indicated detrimental features of the previous construction.

A related object of the invention is to improve anode current collection.

These and related objects and features of the present invention will be more fully understood as the description thereof proceeds, particularly when taken together with the accompanying drawing wherein FIG. 1 is an elevational section of a cell employing the current collector of the invention shown immediately after assembly before expansion of the anode;

FIG. 2 is a top plan view of a simple current collector in accord with the present invention;

FIG. 3 is a front elevational view of the collector of FIG. 2 shown in slightly bent, ready-to-insert position;

In the drawing, like reference characters identify like parts.

Figure 4:
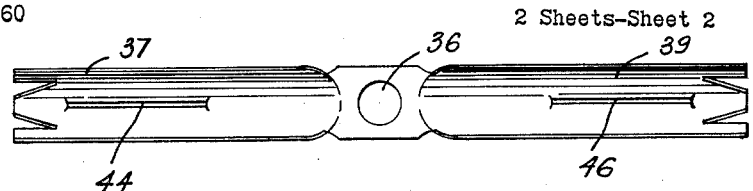
FIG. 4 is a top plan view of a current collector for a different size cell.
Figure 6:
FIG. 6 is an end view of the collector shown on FIGS. 4 and 5.

Referring now to the drawings, FIG. 1 shows a cell which may be provided with the anode collector of the invention, as will be set forth hereinbelow. This cell comprises a cupped metallic can 10 surrounded by an insulating jacket 12. The extremities of the jacket are crimped around the outer edges of insulated top cover 14 and outer bottom metal cover 16. Insulator 17 electrically insulates the can 10 from cover 16. Snugly fitting within can 10 is a tubular cathode 18 suitably made of carbon and manganese dioxide, an lined with a separator 20. Secured to the top of can 10 is a metal cap 22 serving as the positive cathode terminal. Separated from the top of can 10 by means of the separator 20 and plastic insulating disc 24 is a semi-rigid tubular anode 26 formed by extruding a mixture of anode metal, an electrolyte and an electrolyte-swellable binder. The anode is held in place as a result of its own expansion occasioned by its absorbing alkaline electrolyte 15 to eventually press against the separator, at equilibrium. In FIG. 1 the anode is shown prior to its swelling. Suitably the cell closure for this cell is of the type disclosed and claimed in co-pending application Serial No. 11,100, filed February 15, 1960, now United States Patent 3,042,734, issued July 3, 1962. Such a closure comprises an inner metal bottom 28 sealed to cathode 18 by means of seal 30. In grommet 34, a central opening is provided. This opening is of a diameter slightly smaller than the external diameter of rivet 32, so that when rivet 32 is driven through the opening in nylon grommet or gasket 34, the gasket will be radially compressed between inner bottom member 28 and the rivet head, thereby furnishing a tight mechanical seal thereat. Prior to driving rivet 32 through the cover and gasket the same is passed through the central opening 36 in anode collector 38. This opening in the anode collector is shown on all the figures and FIG. 1.

As shown in FIGS. 2 and 3, the anode collector of the invention, suitably fabricated from brass or other conductive easily amalgamated material, consists of an elongated tubular member with central opening 36 formed by inwardly turning inwardly curved legs 37 and 39. Preferably the collector of the invention should be at least one half the length of the anode in which it will be placed.

Figure 5:
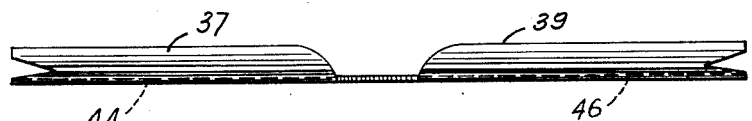
FIG. 5 is a front elevational view of the collector shown on FIG. 4.
Figure 7:
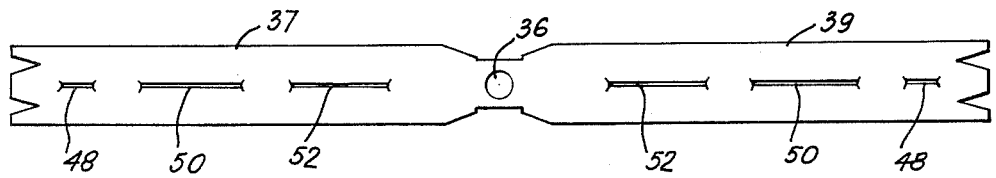
FIG. 7 is a top plan view of a collector for a larger size cell.

Additional embodiments of the invention are shown in FIGS. 4, 5 and 7. The collector of FIG. 4 has slits 44 and 46 in each leg to permit the passage of electrolyte. The legs have jagged extremities to permit them to be beveled inwardly so that the collector can easily be slipped in the extruded anode.

The embodiment shown on FIG. 7 has three slits on each leg, each slit 48, 50 and 52 being of a different length, and also has jagged extremities.

Figure 8:
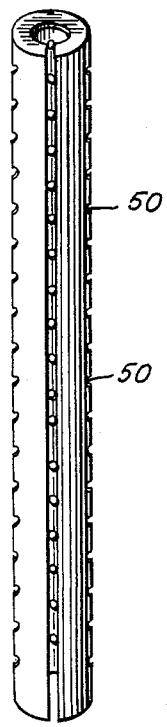
FIG. 8 is a front elevational view of another embodiment of the invention.

The embodiment of FIG. 8 consists of a flat sheet of metal rolled to form a cylinder, the external diameter, of which is a little larger than the internal diameter of the anode, as extruded. A plurality of openings 50 are provided therein to facilitate electrolyte passage therethrough.

The configuration of the subject collector and its positioning within the anode tube limits the inward expansion of the anode and aids in keeping high the flash current of the cell. The success of the present invention is shown by the following results, which compare the flash current amperage of "D" size alkaline manganese dioxide cells using simple wire anode collectors with that of the present construction.

| Variable | Flash current after 3 months |
|---|---|
| Control (wire collector) | 14.7 |
| Brass anode collector | 18.2 |

Obviously, the subject collector may be used with a variety of cell systems as long as it is composed of a material which remains unaffected by the cell reactions. Suitably the collector may be constructed of copper, copper plated steel, and bronze.

The present invention provides a method of current collection whereby a tubular metallic member is inserted in an expansible anode and extends therein for over half the length of said anode. One end of the collector is then connected to a terminal of the cell by driving a suitable conductor such as a brass unit through the central opening in the collector, the conductor being long enough to contact said terminal.

What is claimed is:
1. A dry cell comprising a cupped metallic container, an inner and an outer metal bottom, a separator-lined cathode fitting in said container, a top closure, a tubular semi-rigid swellable anode fitting in said cathode but separated therefrom by said separator and an inert tubular metallic conductor fitting in contact with said anode, said conductor being composed of a material which is unaffected by the electrochemical reactions in said cell, and being secured to said inner metal bottom by means of a rivet, also contacting said outer metal bottom and an insulating grommet surrounding said rivet and insulating said rivet and said collector from said inner bottom.

2. The dry cell of claim 1 wherein said inert tubular metallic conductor which is in contact with said anode is provided with a plurality of slits along its length.

3. The dry cell of claim 2 wherein said inert tubular metallic conductor which is in contact with said anode is at least one-half the length of said anode.

References Cited in the file of this patent

UNITED STATES PATENTS

| | | |
|---|---|---|
| 1,196,611 | Tassin | Aug. 29, 1916 |
| 2,712,565 | William | July 5, 1955 |
| 2,960,558 | Marsal et al. | Nov. 15, 1960 |